United States Patent
Linnartz et al.

(10) Patent No.: US 7,136,783 B2
(45) Date of Patent: Nov. 14, 2006

(54) METHOD AND ARRANGEMENT FOR PROCESSING A SIGNAL USING A DIGITAL PROCESSOR HAVING A GIVEN WORD LENGTH

(75) Inventors: Johan Paul Marie Gerard Linnartz, Eindhoven (NL); Antonius Adrianus Cornelis Maria Kalker, Eindhoven (NL); Johan Cornelis Talstra, Eindhoven (NL); Antonius Adriaan Maria Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/519,064

(22) PCT Filed: Jul. 2, 2003

(86) PCT No.: PCT/IB03/02529

§ 371 (c)(1),
(2), (4) Date: Dec. 22, 2004

(87) PCT Pub. No.: WO2004/006121

PCT Pub. Date: Jan. 15, 2004

(65) Prior Publication Data

US 2005/0267714 A1    Dec. 1, 2005

(30) Foreign Application Priority Data

Jul. 2, 2002    (EP)    ................... 02077660

(51) Int. Cl.
*G06F 15/00*    (2006.01)
(52) U.S. Cl. .................................... 702/190; 324/76.28
(58) Field of Classification Search ................ 702/190, 702/189, 182–185, 76–77; 714/176; 341/76; 324/76.11, 76.12, 76.19, 76.28, 76.29, 76.44
See application file for complete search history.

(56) References Cited

U.S. PATENT DOCUMENTS

2005/0030207 A1*    2/2005    Craven et al. ................ 341/76

FOREIGN PATENT DOCUMENTS

WO    WO 9945707    9/1999

* cited by examiner

*Primary Examiner*—Edward Raymond
(74) *Attorney, Agent, or Firm*—Larry Liberchuk (57) ABSTRACT

Methods and arrangements for processing a signal using a digital processor having a given word length. The signal is pre-processed using a pre-processor which reduces the word length and performs an operation which is invariant with respect to a process being performed by the digital signal processor. This means that if the pre-processor operated with infinite accuracy, it would have no effect on the subsequent process. If such a pre-processor operates with infinite accuracy, it will reduce the guantization noise. In the digital signal processor, the pre-processed signal may be transformed into frequency coefficients which are normalized directly thereafter.

20 Claims, 6 Drawing Sheets

METHOD AND ARRANGEMENT FOR PROCESSING A SIGNAL USING A DIGITAL PROCESSOR HAVING A GIVEN WORD LENGTH

FIELD OF THE INVENTION

The invention relates to methods and arrangements for processing a signal using a digital processor having a given word length.

BACKGROUND OF THE INVENTION

It is well known that common digital signal processing (DSP) operations like Fast Fourier Transforms (FFT), convolutions, Discrete Cosine Transforms (DCT), etc., often require large dynamical ranges for the variables employed in such algorithms. This leads to implementations using floating point arithmetic rather than with fixed point arithmetic, because the latter yield larger rounding noise at equal word-length. Let us first recall the distinction between integer or fixed-point arithmetic on the one hand and floating point arithmetic on the other.

Our goal is to represent numbers in the memory or registers of a computer or digital circuit in the form of binary digits ('0's and '1's). Because of their discrete nature we can only represent a finite set of numbers, all other numbers are "rounded" or "truncated" to one of the representable values, leading to quantization noise. For the sake of the argument let us focus on numbers between −1.0 and 1.0, and say that we have 16-bits available to represent numbers in this range.

for fixed point numbers, all representable numbers are of the form: $n \cdot 2^{-15}$, where n is an integer in the range $[-2^{15} \ldots 2^{15}-1]$. The representable numbers are uniformly spaced. The dynamic range, which is the ratio of the largest to the smallest representable number is $2^{15} \approx 10^5$.

for floating point numbers, all representable numbers are of the form $s \cdot (0.5 + m/2^{a+1}) \times 2^{e-b}$, where m is an a-bit integer, and $(0.5+m/2^a)$ is called the "mantissa" and obviously lies between 0.5 and 1. s is a 1-bit "sign", and e is called the "exponent", a (15-a)-bit number, and b is the exponent-bias. As an example take a 7-bit mantissa and an 8-bit exponent. Then the range 0.5 . . . 1 (set e=b) contains 128 representable numbers 1/256 apart. The range 0.25 . . . 1 (set e=b−1) also contains 128 representable number 1/512 apart, etc. We see that the representable numbers are packed closer together, the closer we get to 0, in a logarithmic fashion. The exponent bias b sets the origin of this quasi-logarithmic scale. In this example the dynamic range is about $2^{256} \approx 10^{77}$.

Floating point numbers are a trade-off between a large dynamic range, and locally uniform distribution of representable numbers. This meshes nicely with the idea that in many relevant computations we need to represent small numbers with a small granularity and large numbers with a large granularity. Another way to say this: the floating point representation matches the "natural distribution of numbers", which is roughly logarithmic, much more closely. For that reason, in practice floating point calculations almost invariably lead to much more accurate results than fixed point calculations with words of the same size (number of bits).

The major drawback of floating point numbers is that they require more complex hardware to perform additions, multiplication etc. E.g. for a floating point addition, both operands have to be normalized to the same exponent, followed by an ordinary addition, and a final re-scaling of the exponent. In software floating-point operations are therefore usually much slower.

In the case of watermark detection, DSP operations like FFTs must happen accurately: a watermark is carefully hidden in the content (often in the least significant bits) and so the signal processor must proceed with care so as not to lose it. However for watermarking in copy-protection or tracing applications, cost is a major issue: it is not a feature which can warrant a higher price in the store. A manufacturer of watermark detectors has two choices to control the accuracy:

use a floating point implementation with relatively high hardware cost (or high CPU-load for software)

use a fixed point implementation, but considering the statements about accuracy above, one is forced to use much longer words for an integer implementation than for a floating points. This also drives up the cost if many memory words are needed for storage, and consequently a lot of memory bandwidth is needed.

Applicant's International Patent Application WO 99/45707 discloses a watermark embedding system (hereinafter referred to as JAWS) to which the invention is particularly applicable. A watermark, which is typically a pseudo random noise sequence or pattern, is added to a motion video signal in the spatial signal domain. For complexity reasons, the same watermark is embedded in every image (field or frame) of the video signal. To reduce the complexity even more, a small watermark pattern is tiled over the image. A typical tile size is 128×128 pixels.

As in many watermark schemes, the watermark detection method is based on correlating the suspect signal with the pseudo random noise sequence. If the correlation exceeds a given threshold, the watermark is said to be present. In the JAWS watermark detector, the tiles of a number of images are folded into a 128×128 buffer. Detection is then performed by correlating the buffer contents with the small watermark pattern.

Figure 1:
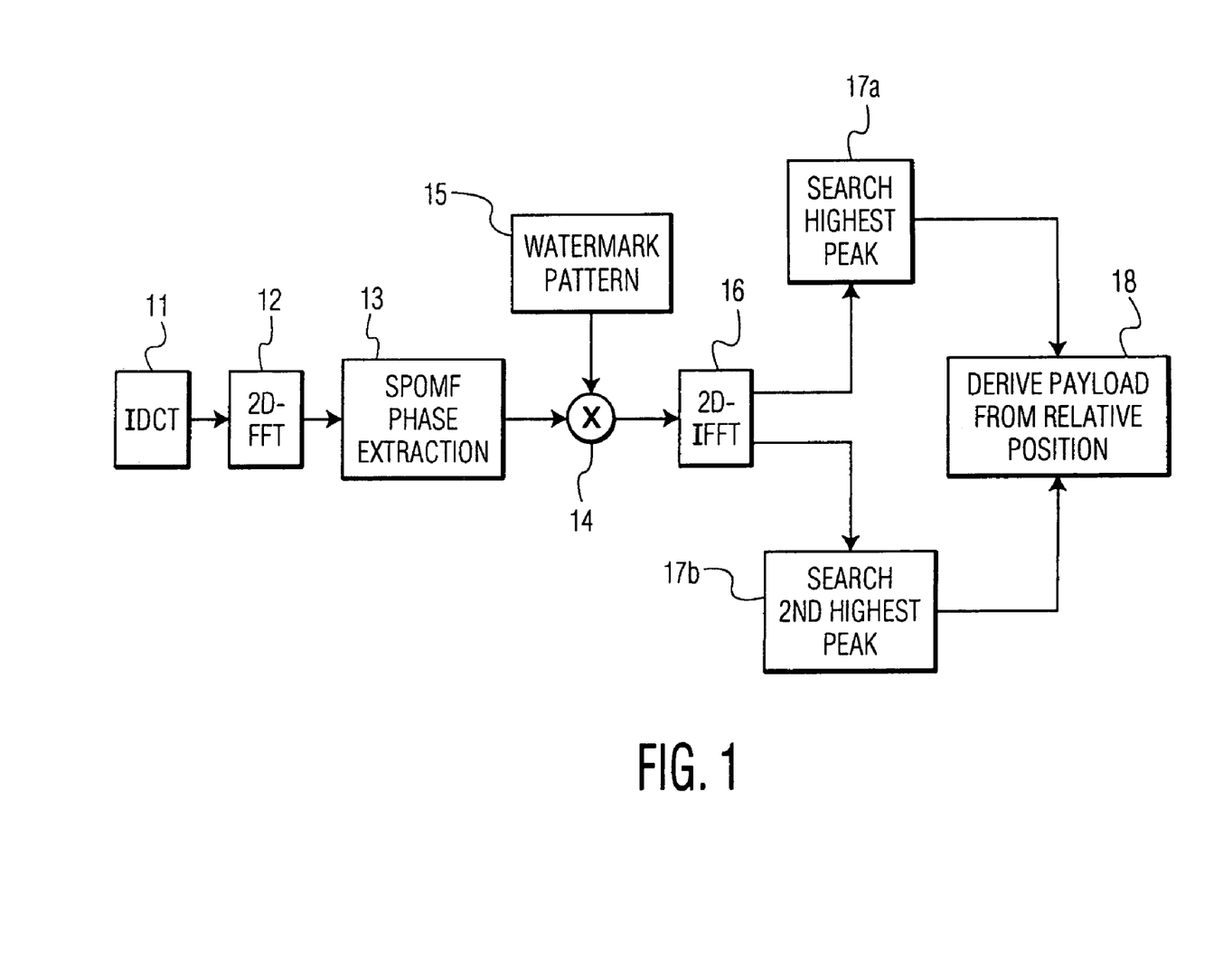
FIG. 1 shows a block diagram indicating the signal processing steps involved to perform watermark detection using the JAWS system.

FIG. 1 shows the signal processing steps of the watermark detection process. The contents of the 128×128 fold buffer 11 is applied to a two-dimensional FFT 12. In a Symmetrical Phase Only Matched Filtering (SPOMF) step 13, the phase of the frequency coefficients is extracted and subsequently correlated (14) with a frequency domain representation of the watermark 15 to be detected. An inverse FFT operation 16 on the results of this correlation process yields a 2-dimensional array of correlation values. If a significant peak is found in this array (17a), the contents is considered to be watermarked. Optionally and advantageously, the contents is also watermarked with a spatially shifted version of the same watermark. In that case, a further peak is searched for (17b). Their relative positions represent an embedded payload, which is decoded by a payload decoder 18.

Since for algorithms like JAWS, memory is the largest cost-factor, a floating point implementation with 17-bit words (8-bit mantissa, 8-bit exponent) was initially developed. For instance, in the 2D FFT-step 12, if one wanted to use integers, one would need about 20 . . . 24 bits (depending on the video-content) to get similar accuracy to the 17-bit floating-point implementation.

From the literature there are many methods known which can help to reduce the word-length for integer FFTs e.g.:

insertion of guard-bits (shifting the input to the right by k bits, if the signal processing step is expected to increase the dynamic range by k-bits). An FFT on $N=2^n$ points increases the dynamic range by N (worst case), so the required insertion of n guard bits is like pre-dividing the input by a factor of N.

using block floating points. Block floating points are really (e.g. 16-bit) fixed points which represent a different range of numbers (like [−1 . . . 1], or [−¼. . . ¼]or [−8 . . . 8]) at different stages in the processing step, depending on the required dynamic range. For instance in an FFT one would choose a new range for the 16-bit variables to represent, after every one of the n stages.

Although these methods are helpful, in general they still cause too much quantization noise to allow e.g. robust watermark detection.

OBJECT AND SUMMARY OF THE INVENTION

It is one of the purposes of this invention disclosure to show how it is possible to use fixed-point implementation to do signal processing with words which are no longer than the floating point implementation.

In accordance with the invention, the signal is pre-processed by a pre-processor which reduces the word length and which is invariant with respect to the subsequent process. The expression "being invariant" means that if the pre-processor operated with infinite accuracy, it would have no effect on the subsequent process.

With the invention is achieved that if such a pre-processor operates with finite accuracy, it will reduce the quantization noise. Advantageous embodiments are defined in the appended sub-claims.

DESCRIPTION OF EMBODIMENTS

Figure 2A:
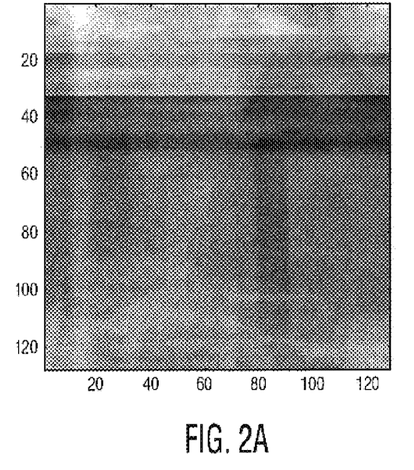
FIG. 2 shows pictures illustrating the operation of the JAWS watermark detection system which is shown in FIG. 1.
Figure 2B:
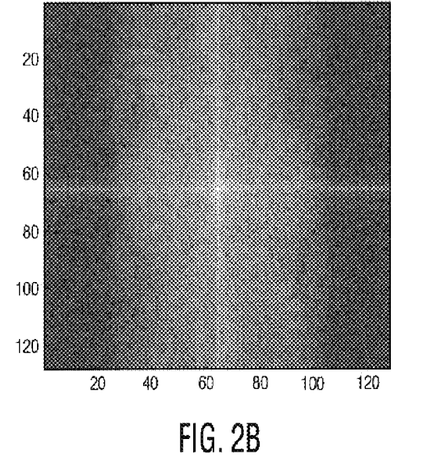

For many applications the statistics of the input-signal to the signal processing step is well known. For instance in the case of the watermark detector shown in FIG. 1, the video-content is strongly peaked in the low horizontal and vertical frequencies. This is illustrated in FIG. 2, where the left picture shows a typical contents of the folding buffer 11 (here 1 second of folded video), and the right picture shows an intensity plot of the spectrum at the output of the FFT 12, with a dynamic range of about 21 bits. The 0-frequency is at the center of the picture. The horizontal and vertical DC-frequencies cause FFT 12 to overflow. Preventing overflow by re-scaling yields even more quantization noise. This quantization noise ultimately obscures the watermark.

According to this invention it is preferred to first apply a (high-pass) filter to the input of the FFT which suppresses the low frequencies with large amplitude, thus reducing the required dynamic range. In fact the filter should be chosen such that it emphasizes those frequencies that contain most of the watermark energy, and cause least quantization noise in that energy range.

Figure 3:
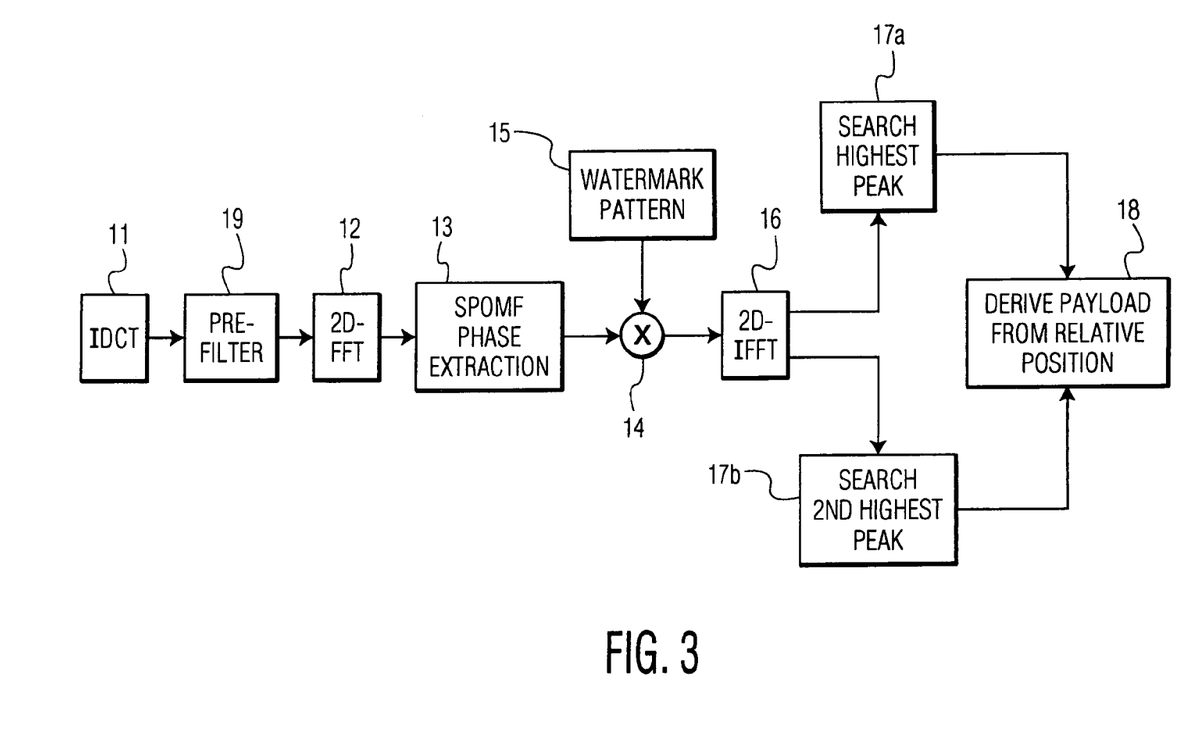
FIG. 3 shows a block diagram of the JAWS watermark detection architecture including a pre-filter in accordance with the invention.

FIG. 3 shows a block diagram of the JAWS watermark detection architecture in accordance with the invention. The diagram is the same as in FIG. 1, but now includes a pre-filter 19 to reduce dynamic-range/overflow/quantization noise problems in the two-dimensional FFT 12.

Figure 4A:
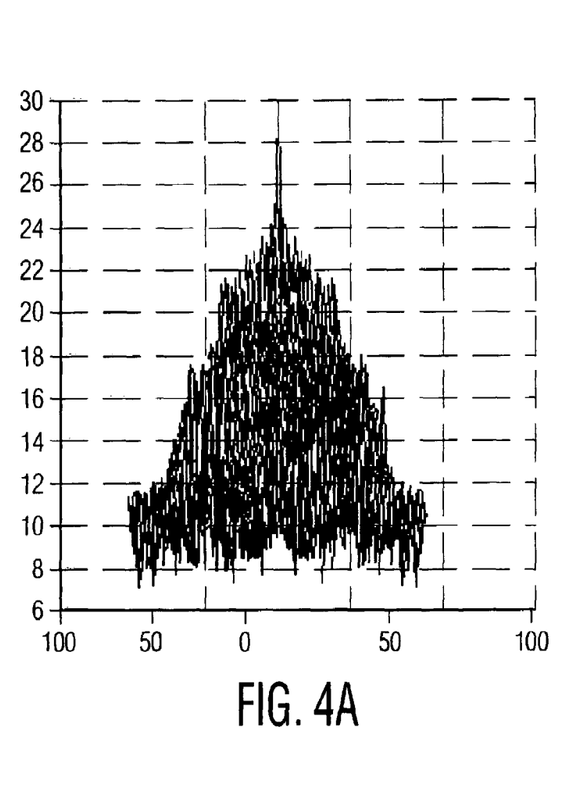
FIG. 4 shows the power spectrum densities of the outputs of the two-dimensional FFTs without (left) and with (right) pre-filtering in accordance with the invention.
Figure 4B:
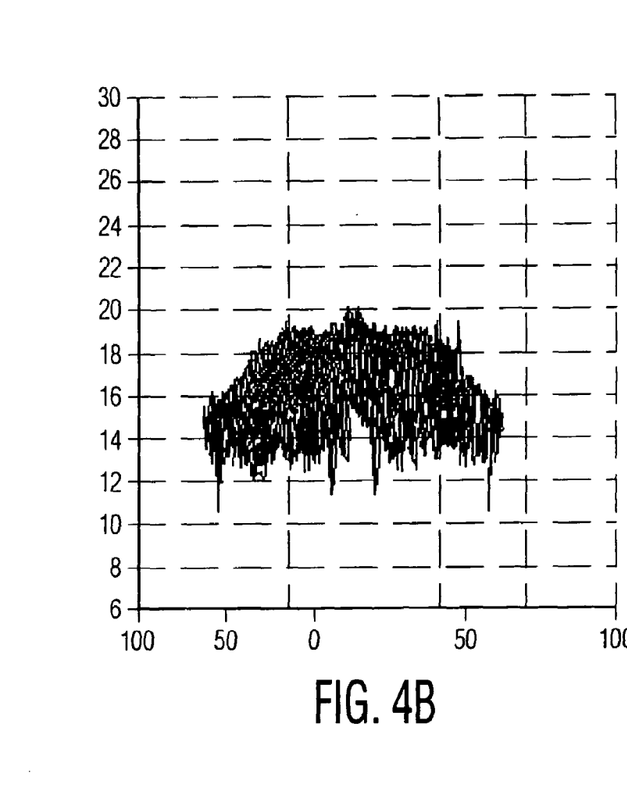

As an example, the contents of fold buffer 11 (cf. the left picture in FIG. 2) is filtered with the two-dimensional filter:

$$\begin{bmatrix} 1 & -2 & 1 \\ -2 & 4 & -2 \\ 1 & -2 & 1 \end{bmatrix}$$

before inputting it into the 2D FFT. The result thereof is shown in FIG. 4. In this Figure, the left diagram shows the two-dimensional power density spectrum of the output of FFT 12 without pre-filtering. The vertical axis is in powers of 2. It is clear that about 21 bits of dynamic range are required to represent the bulk of the coefficients. The right diagram shows the output of the FFT with pre-filtering, using the filter mentioned above. The required dynamic range has been reduced to about 8-bits. The 2D spectra have been projected onto the plane given by x+y=0.

Figure 5:
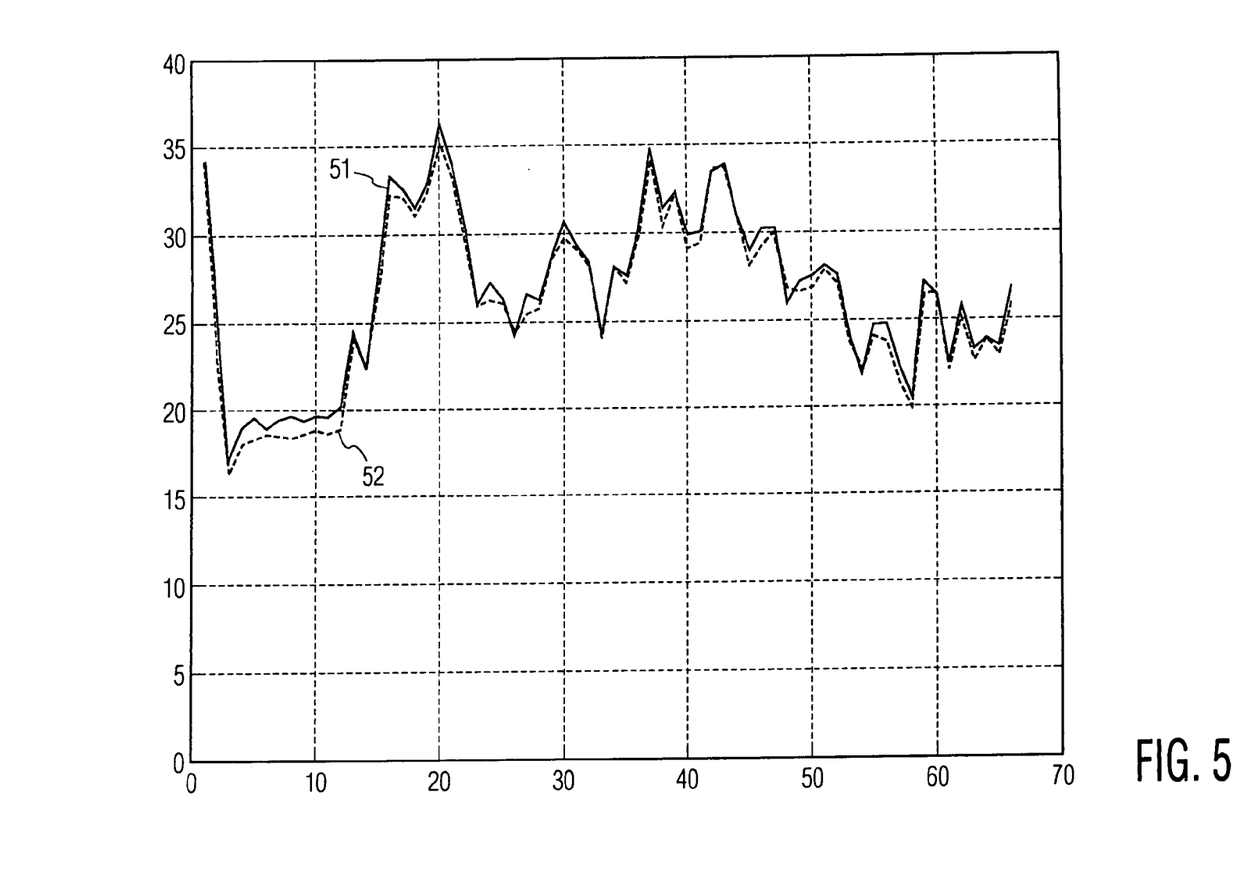
FIG. 5 shows a diagram illustrating watermark detection reliability without and with pre-filtering in accordance with the invention.

It is clear that the pre-filtering step causes a major decrease in required dynamic range to represent the (intermediate) result. In fact in combination with use of 16-bit block-floating point variables throughout the rest of the algorithm, the peak-reliability is almost indistinguishable from a 32-bit floating point implementation. FIG. 5 shows the watermark detection reliability as a function of time for a video sequence, processed once with a 32-bit floating point detector (solid line 51) and once with a 16-bit integer detector (dashed line 52).

Because of the normalization step (SPOMF's phase-extraction 13 right after the 2D FFT 12), the effect of the input filter is purged. In other words: although with infinite precision variables the pre-filter has no effect (its effects are removed by SPOMF), it does reduce quantization noise significantly for a fixed-point implementation.

The advantages of pre-filtering are thus:
cheaper integer-only hardware/smaller CPU-load for integer-only software
allows implementation on integer-only DSP. The vast bulk of DSP in use today, and certainly the only DSPs available in the low-end market, are integer processors. Floating-point DSPs are very expensive.
reduces memory consumption (for JAWS by a factor 16 to 18)
reduces memory bandwidth requirements significantly. Some implementors will not embed the 72 kbytes of RAM needed by the JAWS system on board of a chip but rather re-use 72 Kbytes of an external DRAM memory chip to (like from a 512 kb drive-buffer in a DVD-ROM drive). Since the memory data bus usually has a width of 16-bit, or 32 bits, an 18-bit transfer requires about (32/18) times more data to move across the bus than necessary.

This is particularly problematic in high-speed (16×) DVD-ROM drives, where memory bandwidth is at a premium.

Figure 6:
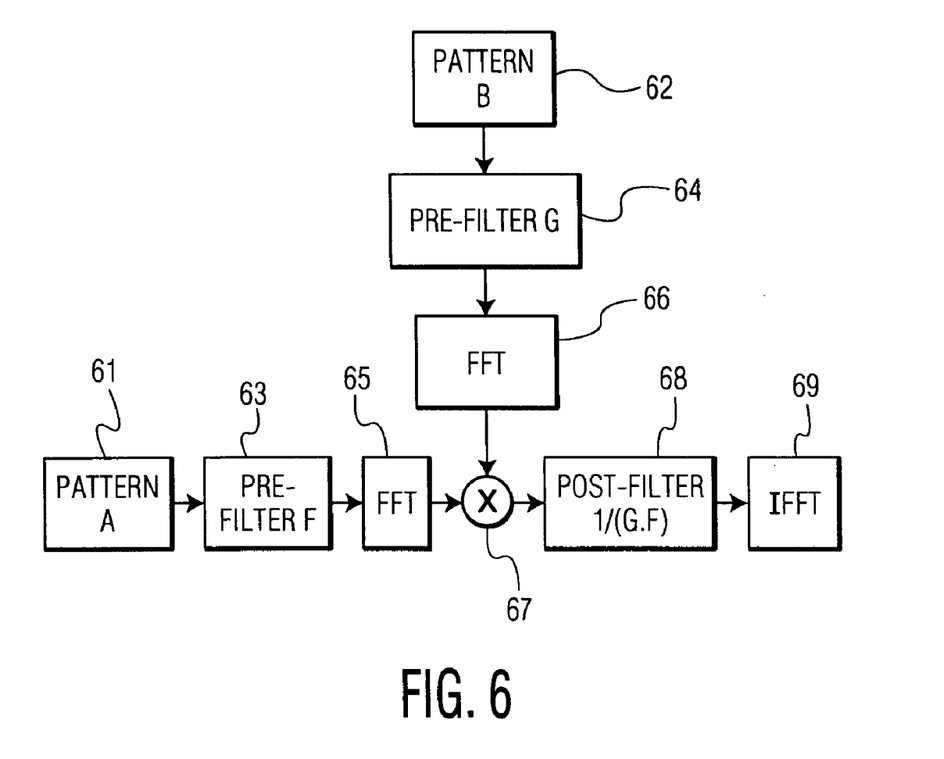
FIG. 6 shows a block diagram illustrating an algorithm for performing cyclical correlations using pre-filters to compress the dynamic range of the input and a post-filter to undo the effects of the pre-filter.

Although the invention emerged out of research in the field of JAWS watermarking, it will be appreciated that the method is general enough to benefit other watermarking methods, or indeed signal processing in general. By way of example, FIG. 6 shows an arrangement for computing the (cyclical) correlation between 2 patterns A (61) and B (62) by performing a multiplication (67) in the frequency domain. In accordance with the invention, appropriately chosen pre-filters F (63) and G (64) are employed, which are adapted to the statistical behavior of the respective patterns A and B so as to control quantization noise in the respective subsequent FFTs 65 and 66. The effect of the filter (which scales the frequency components) is undone by a post-filter 68 before the inverse FFT 69 is applied. If, as often is the case, pattern B is fixed, the post-filtering step may be combined with the pre-filtering and FFT of pattern B.

As another example, consider the fingerprinting technique described in the paper "Robust Audio Hashing for Content Identification," by Jaap Haitsma, Ton Kalker and Job Oostveen, presented at the Content-Based Multimedia Indexing conference 2001, Brescia, Italy. In this technique a "fingerprint" of an audio signal is generated by splitting its power spectrum in a series of frequency bands and coding differences between these bands, both with respect to frequency and with respect to time, in a small number of bits. The fingerprint thus obtained is robust against a wide range of signal distortions, such as MP3 compression, noise addition, all-pass filtering, etc. Typically, the frequency bands considered cover the interval from 300 Hz to 3 kHz.

The power spectrum is obtained by applying a FFT to the downsampled and windowed input signal. As long as a floating-point algorithm is used this is just fine. However, quite often the power spectrum contains a peak near DC, which is substantially higher than the values in the frequency range of interest. This results in excessive quantization noise in that frequency range if an integer FFT with small dynamic range is used. Evidently, this may readily lead to spurious bit errors in the fingerprint, not caused by actual signal distortions, but caused by a deficiency of the implementation. The solution is to remove the DC peak by applying a high-pass filter to the input signal prior to performing the FFT, or alternatively, to apply a band-pass filter which only selects the frequencies of interest.

The invention can be summarized in the following manner. A digital signal processor operating with integer arithmetic circuits has a certain accuracy. Each processing step (multiplication, addition) increases the number of bits (the word length). For example, the Fast Fourier Transform having a butterfly structure requires a plurality of such processing steps to be performed. In practical implementations, the processing steps are recursively performed by a single integer arithmetic circuit having a given word length, say N. After each step, the word length of the signal is reduced to the given word length N by rounding, truncation, or some other smart form of quantization. An obvious way to prevent quantization errors is to scale down the input signal. However, this results in quantization errors to be already introduced in the input signal. For processes such as watermark detection this is fatal, since the least significant bits of the input signal constitute precisely the place where the watermark is embedded.

In accordance with the invention, the signal is pre-processed by a pre-processor which reduces the word length and which is invariant with respect to the subsequent process. The expression "being invariant" means that if the pre-processor operated with infinite accuracy, it would have no effect on the subsequent process. If such a pre-processor operates with finite accuracy, it will reduce the quantization noise. The high-pass pre-filter described above with reference to the JAWS watermark detection process fulfills this condition, because it is a zero-phase filter and the watermark to be detected is carried by the phase of Fourier coefficients.

The invention claimed is:

1. A method of processing a signal using a digital signal processor having a given word length, the method comprising:
pre-processing said signal using a pre-processor which reduces the word length and performs an operation which is invariant with respect to a process being performed by the digital signal processor;
transforming the pre-processed signal into frequency coefficients; and
normalizing the frequency coefficients directly after the transformation of the pre-processed signal into frequency coefficients whereby quantization noise is thereby reduced in said process being performed by the digital signal processor.

2. A method as claimed in claim 1, wherein said process being performed by the digital signal processor is watermark detection, and the pre-processor is a high-pass filter.

3. A method as claimed in claim 1, wherein the preprocessed signal is transformed into frequency coefficients by a Fast Fourier Transform circuit.

4. A method as claimed in claim 1, wherein the preprocessed signal is transformed into frequency coefficients by an integer Fast Fourier Transform circuit.

5. A method as claimed in claim 1, wherein the preprocessed signal is transformed into frequency coefficients by a two-dimensional Fast Fourier Transform circuit.

6. A method as claimed in claim 1, wherein the frequency coefficients are normalized by a symmetrical phase only matched filtering unit that extracts the phase of the frequency coefficients.

7. A method as claimed in claim 1, wherein the pre-processor is a filter which reduces the dynamic range of said signal.

8. A method as claimed in claim 1, wherein the digital signal processor uses integer arithmetic.

9. A method as claimed in claim 1, wherein said signal is preprocessed by the pre-processor prior to the first signal processing step being performed by the digital signal processor.

10. A method of processing a signal received in the form of signal samples having a range of sample values, the method comprising:
filtering the signal to reduce the range of signal sample values in a given band of non-interest, and thereafter
digitally processing the filtered signal using integer arithmetic, said step of digitally processing the filtered signal including transforming the filtered signal into frequency coefficients using an integer transform circuit.

11. A method as claimed in claim 10, wherein said integer transform circuit is a Fast Fourier Transform circuit.

12. A method as claimed in claim 10, wherein the signal samples constitute a first pattern, further comprising:
filtering an additional signal received in the form of a second pattern of signal samples having a range of sample values;
digitally processing the filtered additional signal using integer arithmetic, said step of digitally processing the filtered additional signal including transforming the filtered additional signal into frequency coefficients using an integer transform circuit; and correlating between the first and second patterns by performing multiplication in the frequency domain.

13. A method as claimed in claim 12, further comprising:

applying an inverse transform circuit to the multiplied frequencies; and post-filtering the multiplied frequencies prior to application of the inverse transform circuit.

14. A method as claimed in claim 13, wherein the second pattern is fixed, further comprising combining the post filtering of the multiplied frequencies with the filtering of the additional signal and the transformation of the additional signal into frequency coefficients.

15. A method as claimed in claim 10, wherein said step of digitally processing the filtered signal further comprises normalizing the frequency coefficients directly after the transformation of the preprocessed signal into frequency coefficients.

16. A method as claimed in claim 15, wherein the frequency coefficients are normalized by a symmetrical phase only matched filtering unit which extracts the phase of the frequency coefficients.

17. A digital signal processor comprising:

input means for receiving a signal in the form of integer signal samples having a range of sample values;

filtering means for receiving the signal from said input means and reducing the range of signal sample values in a band of non-interest to form a filtered signal; and a digital signal processing circuit for receiving the filtered signal from said filtering means and digitally processing the filtered signal using integer arithmetic, said digital signal processing circuit comprising an integer transform circuit that transforms the filtered signal into frequency coefficients.

18. A processor as claimed in claim 17, wherein said transform circuit is an integer Fast Fourier Transform circuit.

19. A processor as claimed in claim 17, wherein said digital signal processing circuit further comprises a normalization circuit for normalizing the transformed pre-processed signal.

20. A processor as claimed in claim 19, wherein said normalization circuit comprises a symmetrical phase only matched filtering component which extracts the phase of the frequency coefficients.

* * * * *